Sept. 1, 1925.

Re. 16,152

G. C. HOHEIN

COMBINED COPYHOLDER, SIGHT READER, AND SPACER

Original Filed Oct. 2, 1922 4 Sheets-Sheet 1

Inventor

George C. Hohein.

By Lacey & Lacey, Attorneys

Sept. 1, 1925.

G. C. HOHEIN

Re. 16,152

COMBINED COPYHOLDER, SIGHT READER, AND SPACER

Original Filed Oct. 2, 1922 4 Sheets-Sheet 2

Inventor

George C. Hohein.

By Lacy & Lacy, Attorneys

Sept. 1, 1925.

G. C. HOHEIN

Re. 16,152

COMBINED COPYHOLDER, SIGHT READER, AND SPACER

Original Filed Oct. 2, 1922 4 Sheets-Sheet 3

Inventor
George C. Hohein.

By Lacy & Lacy, Attorneys

Sept. 1, 1925.

G. C. HOHEIN

Re. 16,152

COMBINED COPYHOLDER, SIGHT READER, AND SPACER

Original Filed Oct. 2, 1922 4 Sheets-Sheet 4.

Inventor

George C. Hohein.

By Lacy & Lacy, Attorneys.

Reissued Sept. 1, 1925.

Re. 16,152

UNITED STATES PATENT OFFICE.

GEORGE C. HOHEIN, OF CLARENDON, VIRGINIA, ASSIGNOR OF ONE-HALF TO M. SPERLING, OF ALEXANDRIA, VIRGINIA.

COMBINED COPYHOLDER, SIGHT READER, AND SPACER.

Original No. 1,480,724, dated January 15, 1924, Serial No. 591,860, filed October 2, 1922. Application for reissue filed March 20, 1925. Serial No. 17,107.

*To all whom it may concern:*

Be it known that I, GEORGE C. HOHEIN, a citizen of the United States, residing at Clarendon, in the county of Arlington and State of Virginia, have invented certain new and useful Improvements in Combined Copyholders, Sight Readers, and Spacers, of which the following is a specification.

The present invention relates to an improved sight reader especially constructed for attachment to a typewriting machine for the purpose of holding a stenographic note book or copy in such a manner that the same may be readily seen and read by the typist for transcribing purposes.

An important object of the invention is to provide a device of this nature which includes means for magnifying the stenographic notes or copy so that the same may be readily and easily read by the typist thereby preventing strain on the eyes and allowing the transcribing to be done more speedily.

Another important object of the invention is to provide a device of this nature which may be attached in different adjusted positions in relation to the typewriting machine whereby the typist may sit in a natural position while transcribing the notes or copy contained in the device.

Another object is to provide a feeding mechanism for the device which will deliver the notes or copy line by line as transcribed, enabling the typist to keep and find the place where he or she discontinued writing at any time, thereby effecting a great economy of time and effort in this respect, this mechanism including means whereby the amount of copy fed by the mechanism may be varied in accordance with the needs of the typist.

Another important object of the invention is to provide means whereby the stenographic notes or copy may be readily inserted into the machine, adjusted while therein, or removed therefrom when desired.

Another very important object of the invention is to provide a device of this nature which will be simple and efficient in construction, reliable in operation, comparatively inexpensive to manufacture, durable, neat in appearance and well adapted to the purpose for which it is designed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—

Fig. 2 is a side elevation thereof showing the same attached to a typewriter,

Figure 1:
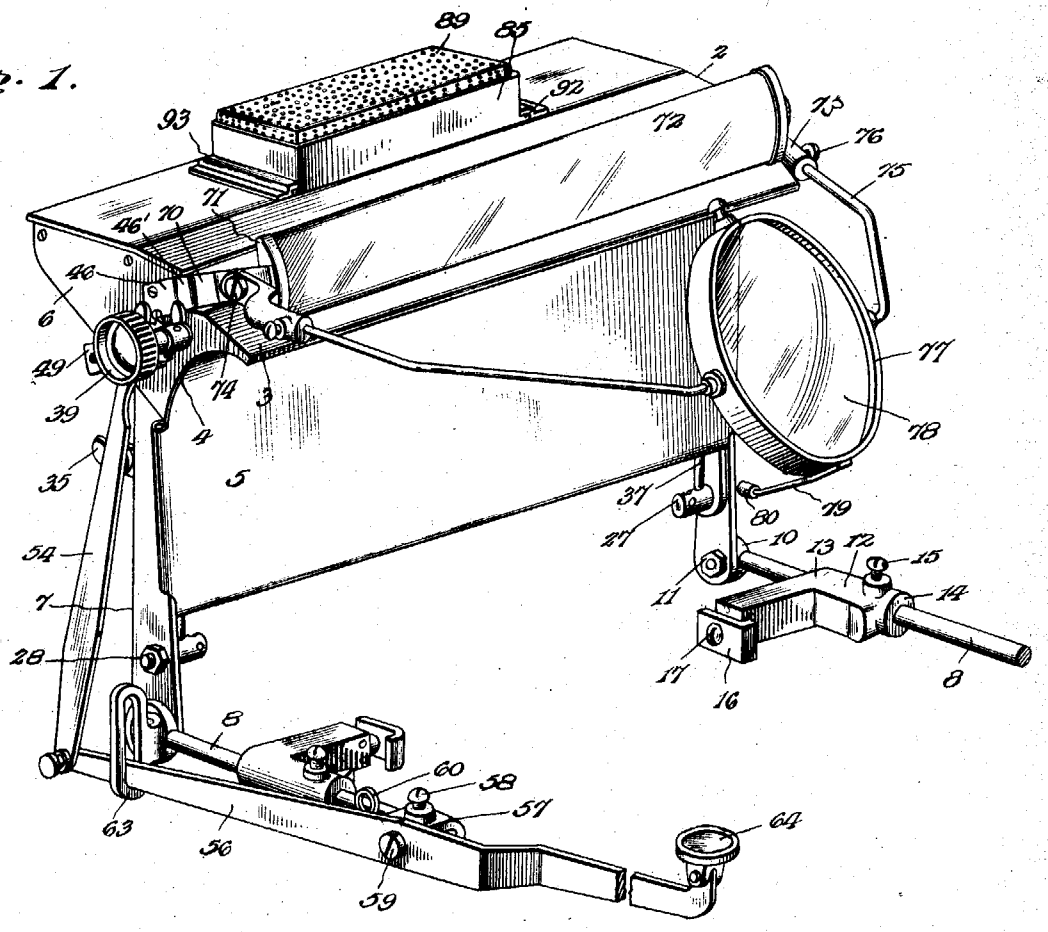
Figure 1 is a perspective of the device embodying my invention.
Figure 7:
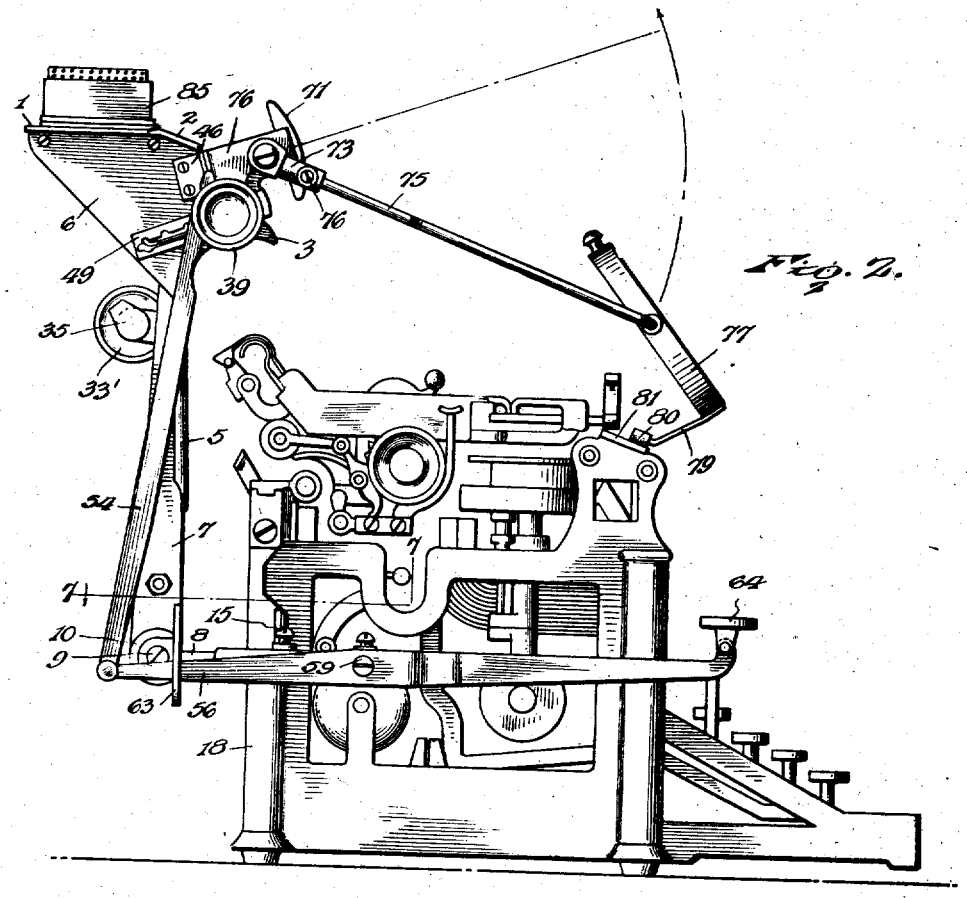
Figure 8:
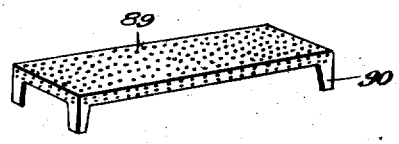
Figure 9:
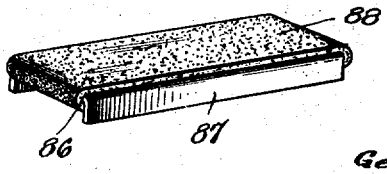
Figure 3:
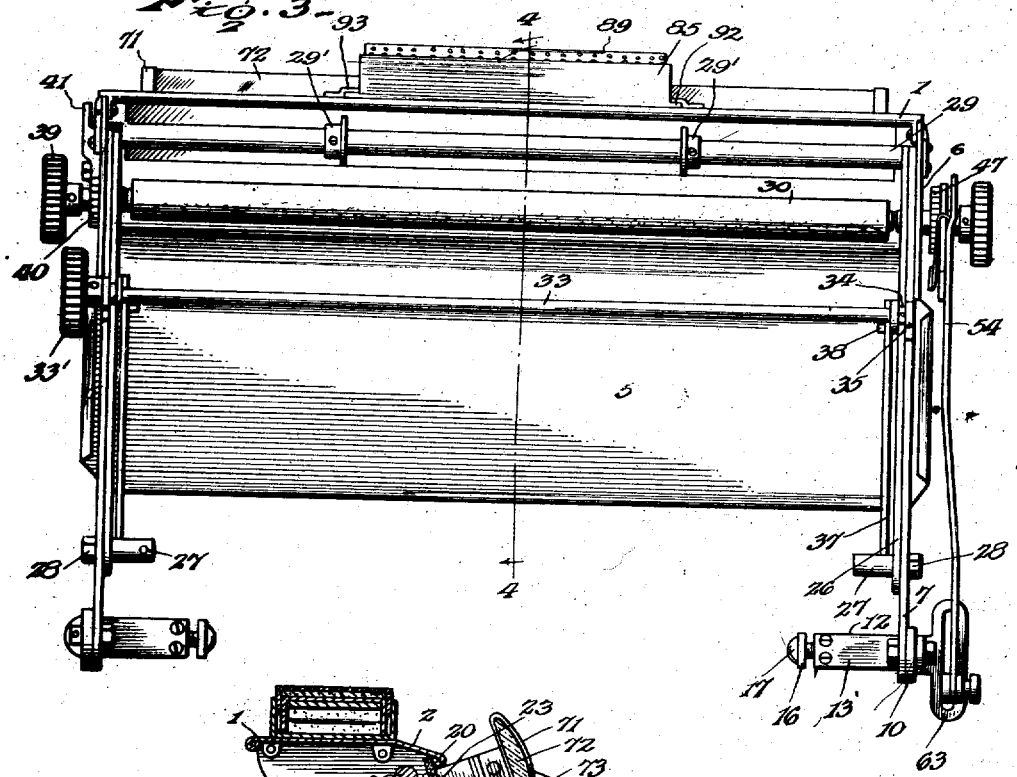
Fig. 3 is a rear elevation thereof.
Figure 4:
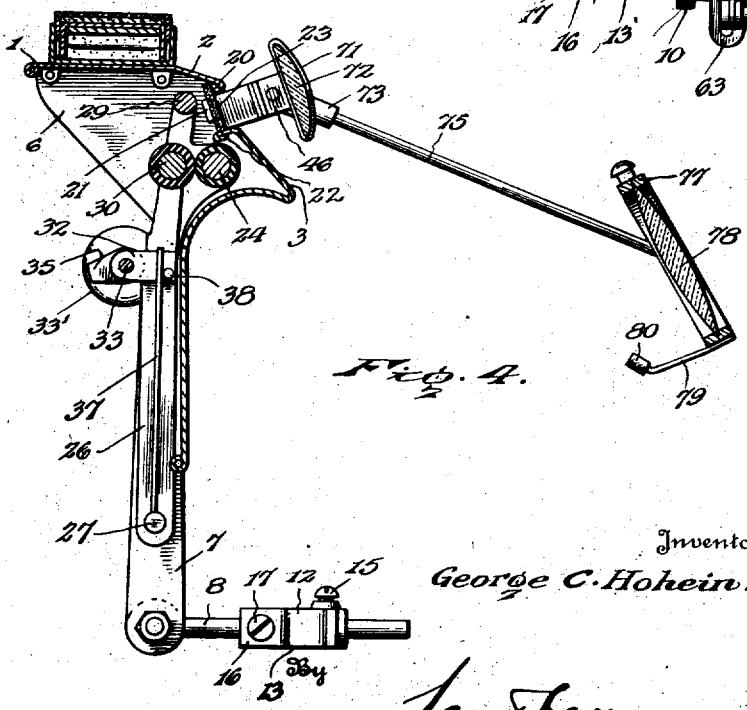
Figure 5:
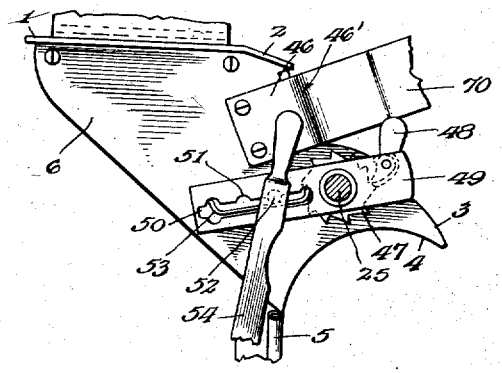
Figure 6:
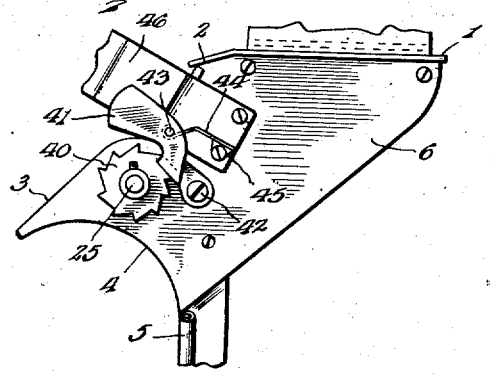
Figure 7:
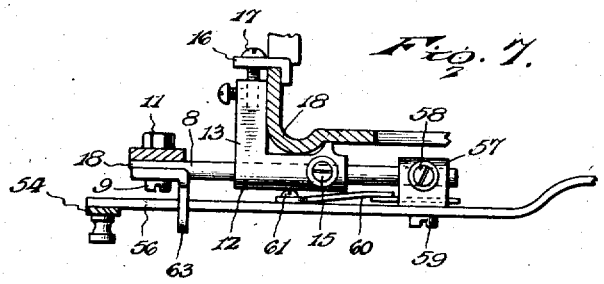

Fig. 4 is a central vertical section taken therethrough substantially on the line 4—4 of Fig. 3, looking in the direction of the arrow, Fig. 5 is a detail side elevation of one end of the body of the device, Fig. 6 is a similar view of the other end of the body, Fig. 7 is a detail section on an enlarged scale taken substantially on the line 7—7 of Fig. 2, looking downwardly, and Figs. 8 and 9 are detail views of the stamp-moistening device.

Referring to the drawings in detail, it will be seen that the body of the sight reader is formed with a top plate 1, the major portion of which is flat and the forward end slightly inclined downwardly, as shown at 2. A front plate 3 has its upper transverse edge spaced from the transverse edge of the slanting portion 2 of the top plate 1, thereby forming a transverse opening or slot in the body of the device. This front plate 3 is constructed with a rearwardly extending semi-circular curved portion 4 which terminates in a depending guard portion 5 shown to advantage in Fig. 3. A pair of side plates 6 are preferably formed integral with the front plate 3 extending at right angles thereto and suitably fixed to the side edges of the top plate 1, thereby firmly bracing this top plate in relation to the front plate and forming a housing for the stenographic notes or copy, it being noted that the depending extension 5 prevents the stenographic notes or copy from coming into contact with any portion of the typewriting machine when the device is attached thereon, as is illustrated in Fig. 2. A pair of brackets 7 are fixed at their upper ends to the side plates 6 depending therefrom and extending a distance beyond the lower edge of the depending portion 5 of the front plate 3. A pair of bracket arms 8 are pivoted to the lower ends of the brackets 7 by means of the bolts 9, it being noted that these bracket arms 8 are provided with apertured disks 10 through which the bolts 9 extend, and by means of the nuts 11 the angular relations of the brackets 7 in respect to the bracket arms 8 may be adjusted as desired. Clamping members are slidably disposed on the bracket arms 8 and are indicated generally at 12. Each clamping member consists of an L-shaped body portion 13, one leg of which is provided with a bore 14 receiving the bracket arm 8 whereby the body is slidable thereon and may be held in adjusted position by a set screw 15. At the end of the other leg of the body 13, there is positioned a clamp plate 16 which is held in place by the screw 17. These clamping members may be disposed on the rear standards 18 of the typewriting machine in any desired vertical position so that the body of the device may be located in proper position so that the stenographic notes or copy carried thereby may be easily and readily read by the typist. It will also be seen that the space between the device and the rear of the typewriter may be varied as may be found desirable, and the angle may also be changed.

The edge 20 of the slanting portion 2 of the top plate 1 is rolled while the side plates 6 are provided with inwardly extending lips 21 and the front plate 3 is provided with a rearward extension 22. The rolled edge 20, the lips 21 and the extension 22 form a seat for a glass plate or strip 23 in the opening between the top plate 1 and the front plate 3 so that the copy may more readily be seen therethrough.

A roller 24 mounted on a shaft 25 is disposed between the side plates 6 immediately below the opening in the body and the shaft 25 thereof is journaled through the side plates 6. A roller supporting frame is disposed within the body and consists of a pair of legs 26 which are fulcrumed at their lower ends on lugs 27 which are provided with threaded shanks and extend through the brackets 7 adjacent their lower ends and are held in non-rotatable relation thereto by the nuts 28. A guide bar 29 spans the upper ends of the legs 26 and a pressure roller 30 is journaled between these legs 26 a distance below said guide bar 29 so as to normally abut the roller 24. A plate 32 is attached to each leg 26 below the side plates 6. These plates extend rearwardly from the legs 26 and support a rod 33 which extends therethrough, being rotatable by knob 33′ and prevented from longitudinal movement by the collars 34 fixed thereto on the outer sides of the plates 32. A pair of cam elements 35 are keyed to the rotatable rod 33 so that by rotating the rod 33 by the knob 33′ these cams may be moved to engage the brackets 7 so as to swing the roller frame for the purpose of releasing or spacing the roller 30 from the roller 25 when it is desired to insert the copy in the device, adjust the same, or remove the same. It is to be understood that the copy is fed from under the two rollers 30 and 24 so as to extend therebetween and over the guide rod 29 which latter may be in the form of a roller if desired. A pair of guide members 29′ in the form of collars are adjustably mounted on the rod 29 so that the copy may move therebetween. The roller 30 is held in engagement with the roller 24 by a pair of spring fingers 37 which extend through and upwardly from the studs 27 and engage lugs projecting from the plate 32, as indicated at 38. Both ends of the shaft 25 are provided with operating knobs 39 so that the copy may be readily adjusted. On the right side preferably of the machine there is disposed on the shaft 25 and keyed thereto a ratchet 40 which is engageable by a pivoted dog 41. This dog 41 is pivoted at 42 and is provided with a lug 43 engageable with a spring 44 suitably held in place by a screw 45 on the bracket arm 46 which is attached to the right hand side plate 6. This spring 44 holds the pivoted dog 41 either in or out of engagement with the ratchet 40 as may be desired.

A ratchet 47 is keyed to the other end of the shaft 25 and is engaged with a spring-pressed pivoted dog 48 which is pivoted at one end of a lever 49 fulcrumed on the shaft 25. The other end of this lever 49 is provided with an elongated slot 50 having a series of notches 51 therein for receiving a pin 52 which is held in the notches normally by a spring 53. The pin or lug 52 is mounted on a link rod 54 which is pivoted at one end to the rear end of a lever 56 which is fulcrumed to a fulcrum block 57. This fulcrum block 57 is slidably mounted on the bracket arm 8 to the left of the device and is held in adjusted position by a set screw 58. The screw 59 pivotally supports the lever 56 on the block 57. A spring 60 is fixed at one end to the block 57 preferably by passing therethrough as is indicated in Fig. 7, and the other end thereof is fixed to the rear end of the lever 56 by a screw 61 thereby normally holding the rear end of this lever depressed. A guide plate 63 is provided with a vertical slot therein through which extends the lever 56 for limiting its movement. A suitable key 64 is positioned on the forward end of the lever 56 and when this key is depressed the lever 56 will be fulcrumed so that the rear end thereof will move upwardly thereby actuating the link bar 54 upwardly which, in turn, fulcrums the lever 49, thereby rotating the ratchet 47 through the intermediary of the spring-pressed dog 48. It will be readily understood that by placing the lug 52 in a notch close to the fulcrum point of the lever 49 the roller will be rotated more than if the lug were located in a notch farther from the fulcrum point of this lever. Thus the operator may regulate the amount of copy to pass the opening in the body at each operation of the key 64.

There are two of the bracket arms 46 which were mentioned previously, one disposed on each of the side plates 6, and these bracket arms 46 are bent so that portions thereof 46′ extend over the ends of the glass strip 23 disposed in the opening of the body. The bodies 70 of these bracket arms 46 slightly converge toward each other and terminate in parallel extending portions which support the lens seats 71. The ends of the magnifying lens 72 are disposed in these seats 71. This lens 72 is of a magnifying nature, being located in registry and forwardly of the opening in the body of the device so that the copy may be readily and easily read without any unnecessary strain on the eyes of the typist. The lens is preferably constructed with a rear concaved face and a front convexed face. A pair of sockets 73 are provided, each of which is pivoted to one of the bracket arms 70 intermediate its ends by a screw 74. The arms 75 are receivable in the sockets 73, being held in place by suitable set screws 76. These arms 75 are curved so as to converge toward each other, terminating a distance from each other and support between their ends a circular lens frame 77. A magnifying lens 78 is carried by the frame 77. A prop rod 79 is disposed at the lower end of the frame 77 so as to extend slightly downwardly and rearwardly therefrom and is provided at its end with a pad element 80 which is adapted to rest upon the gage plate 81 of the typewriter as is illustrated to advantage in Fig. 2. It will be seen that this lens frame may be lifted upwardly and out of the way so that access may be readily had to the paper in the typewriting machine for erasures and the like. Through this lens 78 the writing performed by the machine will be easily visible to the operator so that mistakes may be readily detected and at the same time considerable strain will be relieved from the eyes of the typist.

There is centrally disposed on the upper face of the top plate 1 a stamp-moistening device which consists of a box-like body portion 85 in which is disposed a platform 86 having right angularly extending depending sides 87 resting on the bottom of the body 85. A pad 88 is supported on the platform 86 having its ends curved thereunder for the purpose of holding water or some other moistening liquid. A perforated plate 89 is positioned over the pad 88 and is constructed with depending legs 90 at its corners for resting on the bottom of the body 85 and fitting snugly on the corners of the platform 86. It will be seen that this plate may be depressed so as to cause the moisture to penetrate its apertures by pressing the stamp in engagement therewith. The body 85 of the stamp-moistening device is provided with end extensions 92 at its bottom which engage the cleats 93 fixed to the top plate 1 whereby the moistening device may be readily removed from the sight reader when desired.

Having thus described the invention, I claim:

1. A device of the class described including a body, a plurality of feeding rollers in the body, a ratchet associated with one of the rollers, a lever, a dog supported on one end of the lever engageable with the ratchet for rotation thereof when the lever is fulcrumed in one direction, said lever provided with a slot having a plurality of notches therein, a rod, a pin projecting from the rod and engageable with the notches in the slot of the lever, means for holding the pin in the notches against accidental displacement, and means for actuating the rod so as to fulcrum the lever for rotation of the ratchet and the roller attached thereto.

2. A device of the class described including a body, a roller journaled in the body, a frame fulcrumed in the body, a second roller journaled in the frame, a spring engageable with the frame for holding the second roller in engagement with the first roller, a rod rotatable on the frame, a cam on said rod and engageable with said body, and means for rotating the rod whereby the frame may be fulcrumed so as to separate said rollers.

3. A device of the class described including a body provided with a line-displaying opening, a roller journaled in the body below the opening, means for rotating the roller, a frame fulcrumed in the body, a guide rod disposed at the upper end of the frame in substantial horizontal alinement with the opening of the body, a roller journaled in the frame in horizontal alinement with the first-mentioned roller, a spring engageable with the frame for holding the second-mentioned roller in engagement with the first-mentioned roller, a rod rotatable on the frame, a cam keyed to the rod and engageable with the body, and means for rotating the rod so as to engage the cam with the body so as to fulcrum the frame thereby separating the two mentioned rollers.

4. In combination, a copy-holding and feeding device, a pair of bracket arms pivoted to the device, means for holding the arms in adjusted angular relation with the device, clamp devices for engaging a typewriter or the like, said arms being receivable through said clamp devices so as to be horizontally adjustable, and means in the clamping devices for locking them in engagement with the bracket arms.

5. A device of the class described including a housing to be disposed in rear of a typewriter, means for securing the housing to a typewriter frame, a feed roll mounted in the upper portion of the housing, a lever mounted concentric with the feed roll, means whereby rocking of the lever will impart a step by step movement to the feed roll, an operating lever to be disposed at the side of a typewriter, and a pitman pivoted at its lower end to the operating lever and having its upper end pivotally connected to the first-mentioned lever and adjustable longitudinally thereof to vary the extent of movement of the feed roll.

6. A device of the class described including a housing having side plates, a top plate and a front plate, the top plate and front plate having their adjacent edges spaced apart to define a line-displaying opening, a feed roll mounted in the housing adjacent and below the line-displaying opening, a frame mounted in the housing for rocking movement and normally held toward the feed roll, a second feed roll carried by said frame to cooperate with the first-mentioned feed roll for holding and feeding copy, a guide on the upper end of the said frame above the line-displaying opening whereby to support copy in position extending across the line-displaying opening, the copy being enclosed by the housing, and means for operating the feed roll.

7. A device of the class described including a housing having side plates, a fixed top plate bridging and connecting the upper extremities of the side plates, the forward portion of the top plate being inclined downwardly, and a fixed front plate bridging and connecting the front edges of the side plates, the upper end portion of the front plate being downwardly and forwardly inclined and the portion of the front plate below said downwardly and forwardly inclined portion extending rearwardly and then vertically downward to constitute a guard for copy, the front edge of the top plate and the upper end edge of the front plate being spaced apart to define a transverse line-displaying opening, copy-holding and feeding means within the housing adjacent the line-displaying opening, and means exteriorly of the housing for operating the copy-holding and feeding means.

8. A device of the class described including a housing to be disposed in rear of a typewriter, copy-holding and feeding means within the housing, supporting arms extending forwardly from the housing at the sides thereof to extend alongside of a typewriter, clamps to be secured upon a typewriter frame engaging around the supporting arms, the arms being movable through the clamps whereby to set the housing closer to or farther from the typewriter, and means for securing the supporting arms in the clamps.

9. A device of the class described including a rigid housing having a transverse line-displaying opening in its upper front portion, copy-holding and feeding means within the housing adjacent the line-displaying opening, brackets rigidly supported by the housing at the line-displaying opening, means exterior of the housing for operating the copy-holding and feeding means, and a lens supported by and between the brackets in front of and spaced from the line-displaying opening for magnifying the copy as it is fed across said line-displaying opening by the feeding means.

10. A device of the class described including a housing having a top plate provided with a downturned forward edge, a front plate having a rearwardly projecting extension along its upper edge and having said edge spaced from the forward edge of the top plate to define a line-displaying opening, and side plates having lugs thereon at the ends of said line-displaying opening, a plain lens resting on said lugs and said extension, brackets secured to the housing and projecting therefrom and engaging the ends of the said lens, a magnifying lens carried by said bracket over the plain lens, and copy-holding and feeding means within the housing immediately adjacent the rearward extension of the front plate.

In testimony whereof, I hereto set my hand.

GEORGE C. HOHEIN.